(No Model.)
C. HOBSON.
CULTIVATOR.
No. 497,124. Patented May 9, 1893.
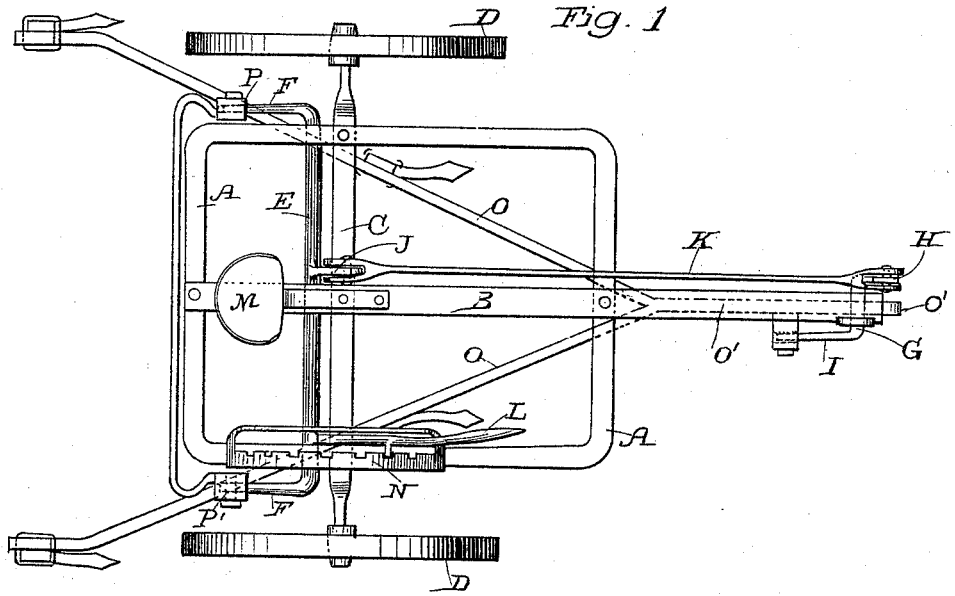
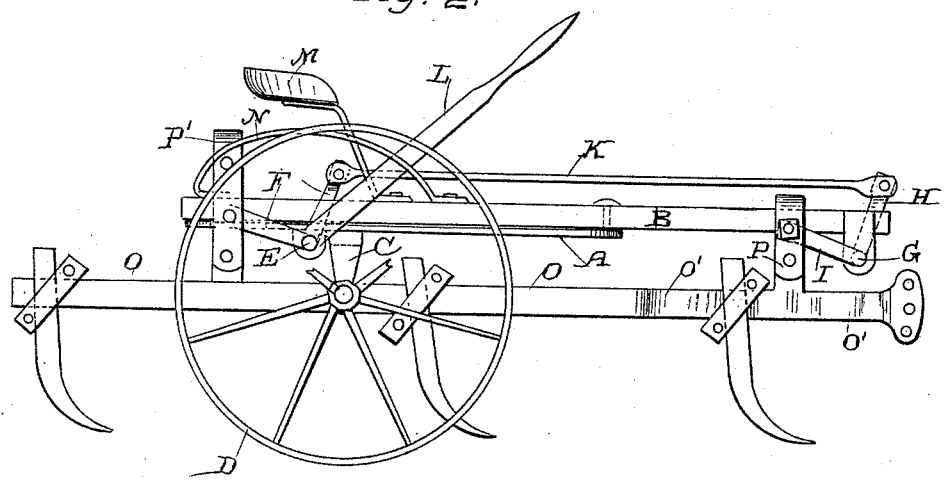
Witnesses,
P. Rouse
J. A. Bayless
Inventor,
Charles Hobson
By Dewey & Co.
Attys

UNITED STATES PATENT OFFICE.

CHARLES HOBSON, OF WATSONVILLE, CALIFORNIA.

CULTIVATOR.

SPECIFICATION forming part of Letters Patent No. 497,124, dated May 9, 1893.

Application filed February 20, 1893. Serial No. 463,096. (No model.)

*To all whom it may concern:*

Be it known that I, CHARLES HOBSON, a citizen of the United States, residing at Watsonville, Santa Cruz county, State of California, have invented an Improvement in Cultivators; and I hereby declare the following to be a full, clear, and exact description of the same.

My invention relates to cultivators, and it consists of a wheel frame to which the bearing wheels are journaled, having a pole by which the team is attached to it, an independently movable cultivator frame suspended beneath the wheel frame, and mechanism by which the cultivator frame is raised and depressed; and in certain details of construction which will be more fully explained by reference to the accompanying drawings, in which—

Figure 1 is a top view of my improved cultivator. Fig. 2 is a side view of the same.

The object of my invention is to provide an improvement in what are known as wheel cultivators, this improvement being such that the independently movable cultivator frame is suspended beneath a rigid wheel frame to which the bearing wheels are journaled immovable with relation to their frame, and a means by which the cultivator frame is easily raised or depressed with relation to the main frame.

A is the main frame which may be made of metal, wood or other suitable material, and B is the pole bolted to said frame and extending from the rear across the front and to a proper distance beyond, having a suitable attachment, not here shown, for a team of horses. Across this frame is rigidly fixed an axle C, upon the ends of which are journaled the bearing-wheels D. This axle may be straight or curved as desired. I prefer to make it curved in order to raise the pole frame sufficiently above the journals of the wheels to allow space for the raising and lowering of the cultivator frame, and at the same time to enable me to employ low wheels, but it will be manifest that a straight axle may be used by using wheels of larger diameter to give sufficient space between the frame and the ground. Across this frame and just behind the fixed axle is journaled a shaft E having rearwardly projecting cranks F upon its opposite ends, and just outside the frame A.

At a point across the pole in front of the frame A is journaled a short crank shaft G having cranks H and I formed upon its ends, standing at right angles with each other.

Upon the shaft E is fixed a rocker-arm J which is parallel with the crank H of the shaft G, and this rocker-arm and the crank are connected together by a rod K, so that when the crank shaft E is turned, the rocker-arm moving with it, will act through the rod K and turn the crank shaft G in unison with the movement of the crank shaft E.

L is a hand-lever also fixed to the crank-shaft E extending upwardly therefrom in convenient relation to the seat M, so that the driver can easily manipulate it.

N is a curved tooth-rack of the usual description, and the hand-lever is provided with a pawl or catch which is adapted to engage the curved rack and hold the lever at any desired point.

O is the cultivator frame which I have shown in the present case made triangular, and having a single bar extension O', from the apex of the triangle, this extension projecting toward the front and beneath the pole. From this extension an arm P extends upward, and has holes made transversely through it for the connection of the crank arm I.

I prefer to make the extension P by extending it up to the desired height, then folding it downward from the top so that two parallel sides are provided sufficiently far apart to admit the crank I, and holes are made through both these sides for a pin or bolt which passes through the end of the crank. By changing this pin to different holes, the front of the cultivator frame O may be raised or depressed with relation to the pole and wheel frame. Upon the rear of the cultivator frame are formed similar upwardly projecting bent or slotted arms P' adapted to receive the ends of the cranks F of the shaft E, which cranks are adjustably connected with the uprights P' by bolts similarly to the connection with the arm P at the front.

By reason of the rocker-arm and the rod connecting it with the crank H at the front, it will be manifest that any movement of the hand lever will be communicated through the shaft E to the rocker-arm, the crank shaft G at the front and through its cranks with the front of the cultivator frame, while by means of the cranks F at the rear, connection is made with the rear end of the cultivator frame, and the frame is either raised or depressed at all parts simultaneously. It will be manifest from this construction that the wheel frame and the driver are supported at all times upon the bearing wheels and the pole, while the cultivator frame, with its teeth only, is raised or depressed by the movement of the lever, and consequently, the amount of power necessary to adjust the cultivator to any depth of cut in the ground, or to raise it entirely out of the ground is comparatively small.

Having thus described my invention, what I claim as new, and desire to secure by Letters Patent, is—

In a cultivator, a triangular frame having its apex at the front, and a single bar extending forward from said apex, vertically slotted arms fixed to the frame extending upwardly therefrom having adjusting holes made through them, a wheel frame having the wheel axle rigidly fixed transversely across it, and a pole extending across from the rear to the front and bolted to it, a shaft journaled to said frame behind the wheel axle having cranks extending rearwardly from it and connecting with the rear vertical arms of the cultivator frame, a second crank shaft journaled across the pole and front of the wheel frame, having a crank pin, one end connecting with the front vertical arms of the cultivator frame, a second crank at right angles therewith connecting with a corresponding rocker-arm upon the main shaft by a connecting rod, and a hand-lever connecting with the main shaft and with a hole in the rack whereby when the hand-lever is moved the cultivator frame has its front and rear end simultaneously raised or depressed with relation to the main wheel frame, substantially as herein described.

In witness whereof I have hereunto set my hand.

CHARLES HOBSON. [L. S.]

Witnesses:
JULIUS LEE,
W. R. RADCLIFF.